United States Patent
Byrne (10) Patent No.: US 12,302,108 B2
(45) Date of Patent: May 13, 2025

(54) SIM SWAP FRAUD DETECTION

(71) Applicant: Telefonaktiebolaget LM Ericsson (publ), Stockholm (SE)

(72) Inventor: Robert Byrne, Docklands (AU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 415 days.

(21) Appl. No.: 17/772,814

(22) PCT Filed: Oct. 30, 2019

(86) PCT No.: PCT/EP2019/079622
§ 371 (c)(1),
(2) Date: Apr. 28, 2022

(87) PCT Pub. No.: WO2021/083503
PCT Pub. Date: May 6, 2021

(65) Prior Publication Data
US 2022/0400384 A1 Dec. 15, 2022

(51) Int. Cl.
*H04W 12/72* (2021.01)
*H04W 12/126* (2021.01)

(52) U.S. Cl.
CPC ......... *H04W 12/72* (2021.01); *H04W 12/126* (2021.01)

(58) Field of Classification Search
CPC ............................ H04W 12/72; H04W 12/126
See application file for complete search history.

(56) References Cited

U.S. PATENT DOCUMENTS

| | | | |
|---|---|---|---|
| 2003/0212616 A1* | 11/2003 | Castrogiovanni ... | H04M 15/745 705/30 |
| 2015/0038120 A1* | 2/2015 | Larkin ................. | H04W 12/04 455/411 |
| 2019/0068604 A1* | 2/2019 | Legault ............... | H04L 63/0861 |

FOREIGN PATENT DOCUMENTS

| | | |
|---|---|---|
| AU | 2016204016 A1 | 1/2017 |
| WO | 2015193629 A1 | 12/2015 |
| ZA | 200906538 B | 5/2010 |

OTHER PUBLICATIONS

International Search Report and the Written Opinion of the International Searching Authority, issued in corresponding International Application No. PCT/EP2019/079622, dated Jul. 9, 2020, 15 pages.
(Continued)

*Primary Examiner* — Quazi Farooqui
(74) *Attorney, Agent, or Firm* — Rothwell, Figg, Ernst & Manbeck, P.C.

(57) ABSTRACT

There is provided mechanisms for detecting SIM swap fraud. A method is performed by a classifier entity. The method comprises monitoring subscriber update data request messages sent as part of an update data procedure between a first network entity and a second network entity in a mobile network. The method comprises determining that one or more of the subscriber update data request messages is associated with SIM swap fraud by verifying that the subscriber update data request messages fulfil a set of conditions. The set of conditions pertain at least to: an MSISDN of a first subscriber entity in the mobile network within a first predefined timeframe is associated with more than one IMSI, and/or an IMSI of a second subscriber entity in the mobile network within a second predefined timeframe is associated with more than one MSISDN. The method comprises performing, upon the set of conditions is fulfilled for the one or more of the subscriber update data request (Continued)

messages, an action according to which the IMSI of the second subscriber entity is associated with SIM swap fraud.

16 Claims, 4 Drawing Sheets

(56) References Cited

OTHER PUBLICATIONS

Mohammad et al. "Methods for Addressing Duplicate Device Identifiers and Genuine Devices" International Telecommunication Union, Telecommunication Standardization Sector, Q15/11-DOC1 (190624), Study Group 11, Study Period 2017-2020, pp. 1-13.

* cited by examiner

SIM SWAP FRAUD DETECTION

CROSS REFERENCE TO RELATED APPLICATION(S)

This application is a 35 U.S.C. § 371 National Phase Entry Application from PCT/EP2019/079622, filed Oct. 30, 2019, designating the United States, the disclosure of which is incorporated herein by reference in its entirety.

TECHNICAL FIELD

Embodiments presented herein relate to a method, a classifier entity, a computer program, and a computer program product for detecting subscriber identity module (SIM) swap fraud.

BACKGROUND

In general terms, SIM swap fraud is defined by the process according to which an attacker ports over the phone number of a victim to its own SIM card, where the attacker then might perform one or more malicious actions, such as malicious extraction of funds from mobile banking systems, malicious sending of two factor authentication codes that uses text messages, malicious access of voice mail, and so forth.

To successfully commit the SIM swap fraud, the attacker, with a foothold in the relevant position in the mobile network, might need to carry out actions, represented by the following steps: 1) obtain the international mobile subscriber identity (IMSI) and (optionally) a secret key, Ki) of the victim subscriber(s) SIM card, 2) move the Mobile Station International Subscriber Directory Number (MSISDN) of the victim to the IMSI of the attacker, thus performing SIM swap, 3) perform one or more fraudulent actions, and 4) (optionally) swap the MSISDN of the victim back to their correct IMSI.

The listed actions might be executed during the night time (in the time-zone of the victim) to reduce the likelihood of the victim noticing they have temporarily lost network service (starting at the point of time when step 2 is executed, ending at the point of time when step 4 is executed). Steps 1, 2 and 4 are performed using provisioning requests.

Traditional prevention of SIM swap fraud relies on implementing controls in the customer interaction with an operator customer care organization (such as showing the ID/passport in person) or notification and confirmation to the subscriber before the activity is executed. However, such control might be insufficient to prevent the above disclosed scenario.

Hence, there is a need for improved detection of SIM swap fraud.

SUMMARY

An object of embodiments herein is to provide efficient detection of SIM swap fraud.

Further, considering that there are potentially tens, or even hundreds of thousands, of valid requests occurring daily for moving MSISDNs to IMSIs, one challenge is to identify only fraudulent requests, especially those requests coming from an entity within the mobile network, i.e., from an entity having access to the mobile network.

A particular object is therefore to identify those valid requests that are associated with SIM swap fraud.

According to a first aspect there is presented a method for detecting SIM swap fraud. The method is performed by a classifier entity. The method comprises monitoring subscriber update data request messages sent as part of an update data procedure between a first network entity and a second network entity in a mobile network. The method comprises determining that one or more of the subscriber update data request messages is associated with SIM swap fraud by verifying that the subscriber update data request messages fulfil a set of conditions. The set of conditions pertain at least to: an MSISDN of a first subscriber entity in the mobile network within a first predefined timeframe is associated with more than one IMSI, and/or an IMSI of a second subscriber entity in the mobile network within a second predefined timeframe is associated with more than one MSISDN. The method comprises performing, upon the set of conditions is fulfilled for the one or more of the subscriber update data request messages, an action according to which the IMSI of the second subscriber entity is associated with SIM swap fraud.

According to a second aspect there is presented a classifier entity for detecting SIM swap fraud. The classifier entity comprises processing circuitry. The processing circuitry is configured to cause the classifier entity to monitor subscriber update data request messages sent as part of an update data procedure between a first network entity and a second network entity in a mobile network. The processing circuitry is configured to cause the classifier entity to determine that one or more of the subscriber update data request messages is associated with SIM swap fraud by verifying that the subscriber update data request messages fulfil a set of conditions. The set of conditions pertain at least to: an MSISDN of a first subscriber entity in the mobile network within a first predefined timeframe is associated with more than one IMSI, and/or an IMSI of a second subscriber entity in the mobile network within a second predefined timeframe is associated with more than one MSISDN. The processing circuitry is configured to cause the classifier entity to perform, upon the set of conditions is fulfilled for the one or more of the subscriber update data request messages, an action according to which the IMSI of the second subscriber entity is associated with SIM swap fraud.

According to a third aspect there is presented a classifier entity for detecting SIM swap fraud. The classifier entity comprises a monitor module configured to monitor subscriber update data request messages sent as part of an update data procedure between a first network entity and a second network entity in a mobile network. The classifier entity comprises a determine module configured to determine that one or more of the subscriber update data request messages is associated with SIM swap fraud by verifying that the subscriber update data request messages fulfil a set of conditions. The set of conditions pertain at least to: an MSISDN of a first subscriber entity in the mobile network within a first predefined timeframe is associated with more than one IMSI, and/or an IMSI of a second subscriber entity in the mobile network within a second predefined timeframe is associated with more than one MSISDN. The classifier entity comprises an action module configured to perform, upon the set of conditions is fulfilled for the one or more of the subscriber update data request messages, an action according to which the IMSI of the second subscriber entity is associated with SIM swap fraud.

According to a fourth aspect there is presented a computer program for detecting SIM swap fraud, the computer program comprising computer program code which, when run on a classifier entity, causes the classifier entity to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously, this provides efficient detection of SIM swap fraud.

Advantageously, this provides efficient identification of those valid requests that are associated with SIM swap fraud.

Advantageously, this provides a mechanism for a network operator to efficiently detect the occurrence of SIM swap fraud in a timely manner.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
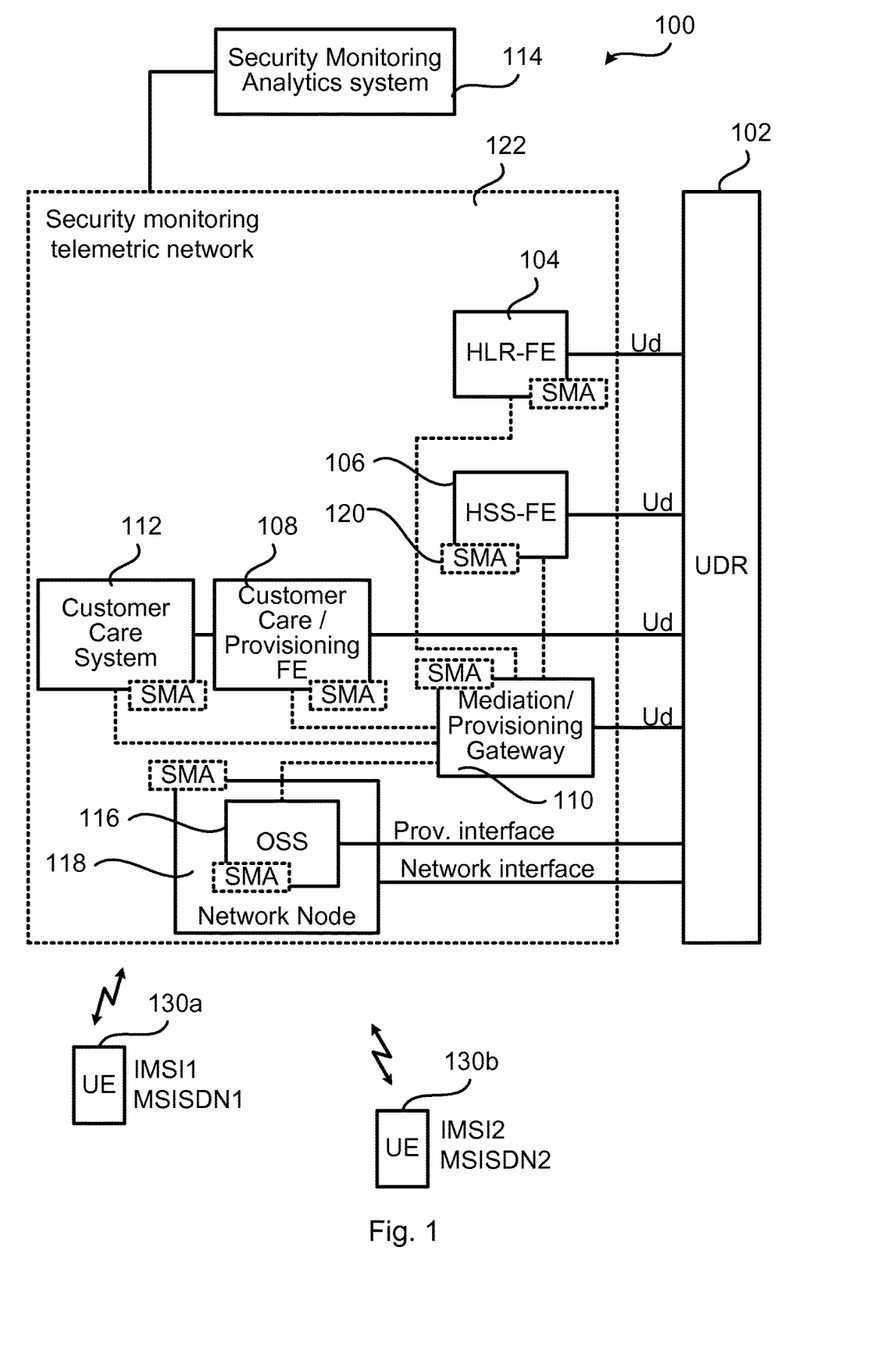
FIG. 1 is a schematic diagram illustrating a mobile network according to embodiments.

FIG. 1 is a schematic diagram illustrating a mobile network too where embodiments presented herein can be applied. Interfaces (in terms of Ud interface, provisioning interface, customer adaptation interface, network interface) between the entities are also illustrated in FIG. 1. The mobile network 100 comprises a Unified Data Repository (UDR) 102, a security monitoring telemetric network 122, and a security monitoring analytics system 114. In turn the security monitoring telemetric network 122 comprises Front Ends (FEs) such as a Home Location Register (HLR) FE 104, a Home Subscriber Server (HSS) FE 106, and a customer care/provisioning FE 108, a mediation/provisioning entity 110 (or gateway), a customer care system 112, an Operations Support System (OSS) 116, a network node 118 in which the OSS is provided, and Security Monitoring Agents (SMAs) 120. The security monitoring analytics system 114 or at least one of the SMAs 120 might comprise a classifier entity 200. An Authentication Centre (AuC) might be co-located within the HLR. The UDR might represent a Centralized User Database (CUDB). Any of the OSS, the provisioning gateway, and the provisioning FE might represent a network management system.

The provisioning FE is an application FE for the purpose of provisioning the UDR. The provisioning FE provides means to create, delete, modify and retrieve user data, see 3GPP TS 23.335 version 15.0.0 Release 15, page 9. The provisioning gateway provides a single logical point for consistent provisioning of user data for all services in the UDR, see 3GPP TS 32.181 version 15.0.0 Release 15, page 20.

The UDR is a database that stores MSISDNs and IMSIs which are user identifiers. The procedures relating to a SIM swap generally occur from the customer care/provisioning Front-End or mediation/provisioning gateway to an application FE (HLR FE, AuC in the HLR FE, or HSS FE) towards the UDR.

Two or more subscriber entities 130a, 130b, represented by respective pieces of User Equipment (UE), and associated with respective IMSIs and MSIDSNs, are operatively connected to the mobile network 100 via the network node 118. Hereinafter, for ease of notation, one of the subscriber entities will be denoted a first subscriber entity 130a (and is associated with a first IMSI, denoted IMSI1, and a first MSISDN, denoted MSISDN1) and another of the subscriber entities will be denoted a second subscriber entity 130b (and is associated with a second IMSI, denoted IMSI2, and a second MSISDN, denoted MSISDN2). However, this does not imply any hierarchical relation between these two, or any other, subscriber entities. Further, for illustrative purposes, the first subscriber entity 130a will act as a victim of SIM swap fraud whereas the second subscriber entity 130b will act as an attacker performing the SIM swap fraud.

As disclosed above, there is a need for improved detection of SIM swap fraud. In this respect, considering there are potentially tens, or even hundreds of thousands, of valid requests occurring daily, one challenge is to identify only fraudulent requests. The herein disclosed embodiments are based on configuring the classifier entity 200 to identify a specific sequence of requests that indicates a high probability of SIM swap fraud occurring in the mobile network 100.

The embodiments disclosed herein relate to mechanisms for detecting SIM swap fraud. In order to obtain such mechanisms there is provided a classifier entity 200, a method performed by the classifier entity 200, a computer program product comprising code, for example in the form of a computer program, that when run on a classifier entity 200, causes the classifier entity 200 to perform the method.

Figure 2:
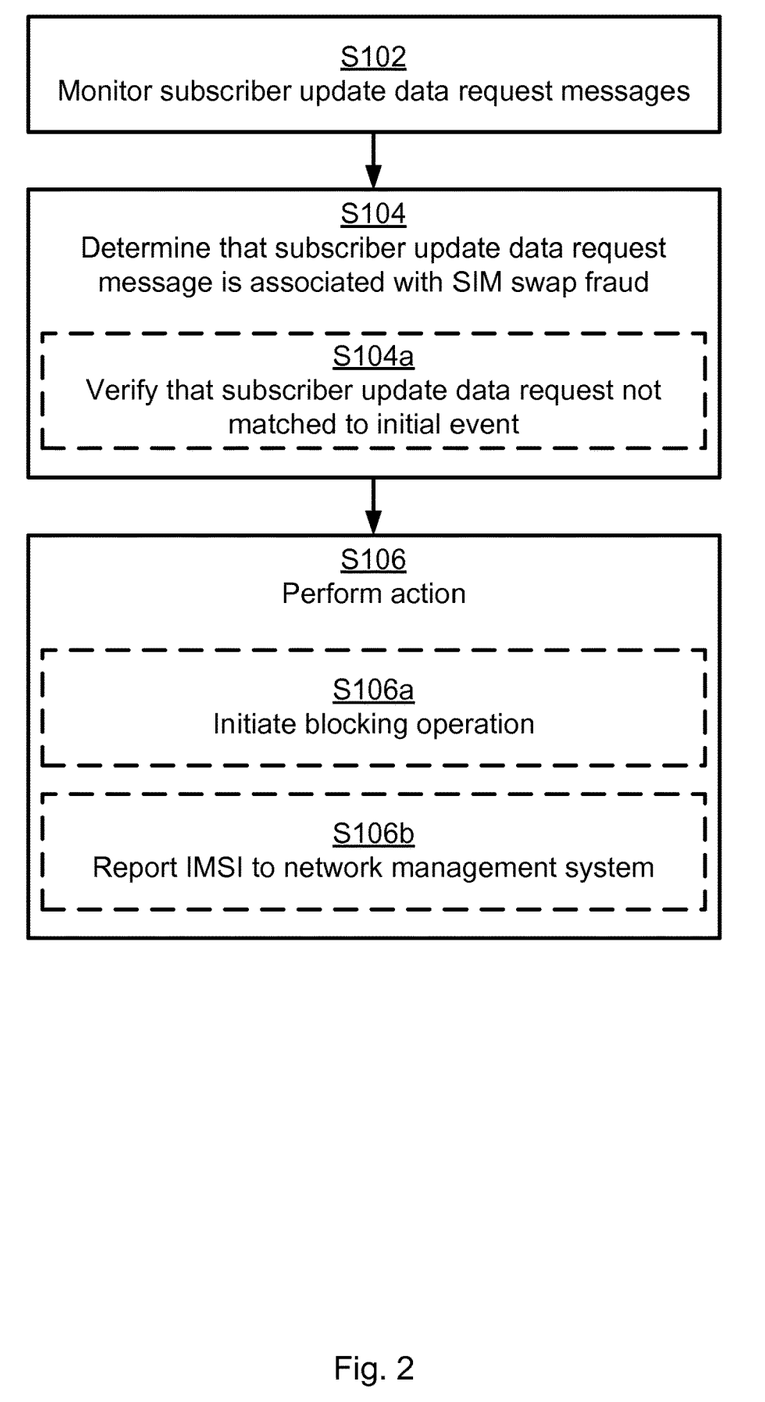
FIG. 2 is a flowchart of methods according to embodiments.

FIG. 2 is a flowchart illustrating embodiments of methods for detecting SIM swap fraud. The methods are performed by the classifier entity 200. The methods are advantageously provided as computer programs 620.

S102: The classifier entity 200 monitors subscriber update data request messages. The subscriber update data request messages are sent as part of an update data procedure between a first network entity and a second network entity in the mobile network 100.

S104: The classifier entity 200 determines that one or more of the subscriber update data request messages is associated with SIM swap fraud. The classifier entity 200 determines this by verifying that the subscriber update data request messages fulfil a set of conditions.

In this respect, if a subscriber entity is, within a first predefined timeframe, associated with more than one IMSI, this could indicate that this subscriber entity is victim of SIM swap fraud. Further, in this respect, if a subscriber entity is, within a second predefined timeframe, associated with more than one MSISDN, this could indicate that this subscriber entity is performing SIM swap fraud. The set of conditions thus pertain at least to: an MSISDN of a first subscriber entity 130a served in the mobile network 100 within a first predefined timeframe is associated with more than one IMSI, and/or an IMSI of a second subscriber entity 130b served in the mobile network 100 is, within a second predefined timeframe, associated with more than one MSISDN.

S106: The classifier entity 200 performs, upon the set of conditions being fulfilled for the one or more of the subscriber update data request messages, an action according to which the IMSI of the second subscriber entity 130b is associated with SIM swap fraud.

Further conditions will be disclosed below. All conditions within the set of conditions collectively contribute to the classifier entity 200 being enabled to detect occurrence of the SIM swap fraud. The more conditions are fulfilled, the higher the chance that SIM swap fraud is occurring.

Subscriber update data request messages are thus monitored and analyzed to detect a specific pattern of events occurring in the mobile network 100, where the specific pattern of events indicates if a SIM swap fraud is occurring, or has occurred, in the in the mobile network 100 so that an appropriate action can be performed.

Embodiments relating to further details of detecting SIM swap fraud as performed by the classifier entity 200 will now be disclosed.

There might be different ways for the classifier entity 200 to monitor the subscriber update data request messages in S102. In some aspects, the classifier entity 200 is configured to in S102 intercept the subscriber update data request messages online. In other aspects the classifier entity 200 is configured to in S102 retrieve the subscriber update data request messages offline. Particularly, in some embodiments, the subscriber update data request messages are monitored either by being intercepted online between the first network entity and the second network entity or by being retrieved offline from a database. The classifier entity 200 might be configured to intercept the subscriber update data request messages through passive network taps or data transfer from a provisioning system. The subscriber update data request messages might be fed into the classifier entity 200 either in-line (proxy) or out of bounds via port mirroring. For retrieval offline from a database, log content from a provisioning system might be fed into the classifier entity 200.

There might be different types of interfaces over which the subscriber update data request messages are sent, and thus intercepted by the classifier entity 200. According to non-limiting examples, the subscriber update data request messages are intercepted over the Ud interface, a provisioning interface, a customer adaptation interface or a network interface. These interfaces are illustrated in FIG. 1.

In some aspects, the subscriber update data request messages are sent from the second network entity towards the first network entity. There might be different types of network entities between which the subscriber update data request messages are sent. In some non-limiting examples the second network entity is any of: a customer care/provisioning Front-End, a customer care system, a mediation/provisioning gateway. In some non-limiting examples the first network entity is any of: an HLR FE, an AuC in the HLR FE, an HSS FE, and a CUDB in the UDR. A subscriber update data request message sent as part of an update data procedure used by an application FE to modify user data in the UDR might thus be intercepted and used by the classifier entity 200. The classifier entity might also intercept subscriber update data request messages between the OSS or anther node (e.g., customer care system) over a provisioning interface towards the provisioning FE or provisioning gateway as opposed to over the Ud interface.

As a first example the subscriber update data request messages are sent over the Ud interface between any of an HLR FE, AuC in the HLR FE, or HSS FE, and a mediation/provisioning gateway.

As a second example the subscriber update data request messages are sent over the provisioning interface between any of an OSS, other customer care system, or mediation system and any of a provisioning FE, or a provisioning gateway.

As a third example the subscriber update data request messages are sent over the customer adaptation interface towards a mediation/provisioning gateway, or a subscriber data management system, which issues the relevant messages towards any of an HLR FE, HSS FE, and CUDB in the UDR.

There might be different types of subscriber update data request messages. In general terms, the type of subscriber update data request message depends on over which interface the message is sent and between what types of network entities the message is sent. For example, the subscriber update data request messages might pertain to modifying user data in the UDR. The subscriber update data request messages might thus be update data request messages sent as part of the update data procedure to modify user data in the UDR.

There might be different ways to perform the determination in S104. Aspects relating thereto will now be disclosed.

In some aspects, the determination involves checking whether the subscriber update data request messages can be matched to an initial event invoking the update data procedure with a customer care system in the mobile network too. In particular, according to an embodiment, the classifier entity 200 is configured to perform S104a as part of the determination in S104:

S104a: The classifier entity 200 verifies that the one or more of the subscriber update data request messages cannot be matched to any initial event invoking the update data procedure with a customer care system in the mobile network 100.

There may be different scenarios where the one or more of the subscriber update data request messages that the classifier entity 200 monitors are indicative of SIM swap fraud and thus might aid the classifier entity 200 when performing the determination in S104.

A first scenario where the one or more of the subscriber update data request messages that the classifier entity 200 monitors are indicative of SIM swap fraud is to where it could be suspected that one or more of the subscriber update data request messages pertains to the MSISDN of the first subscriber entity 130a being swapped to the IMSI of the second subscriber entity 130b. Particularly, according to some embodiments, the one or more of the subscriber update data request messages pertains to a first move of the MSISDN of the first subscriber entity 130a to be associated with the IMSI of the second subscriber entity 130b.

A second scenario where the one or more of the subscriber update data request messages that the classifier entity 200 monitors are indicative of SIM swap fraud is where it could be suspected that one or more of the subscriber update data request messages pertains to the MSISDN of the first subscriber entity 130a being swapped back to the IMSI of the first subscriber entity 130a. Particularly, according to some embodiments, the one or more of the subscriber update data request messages pertains to a second move of the MSISDN of the first subscriber entity 130a back to be associated with the IMSI of the first subscriber entity 130a.

Further, the classifier entity 200 might be configured to, when monitoring the subscriber update data request messages, measure the amount of time between when the MSISDN of the first subscriber entity 130a being swapped to the IMSI of the second subscriber entity 130b and when the MSISDN of the first subscriber entity 130a being swapped back to the IMSI of the first subscriber entity 130a. This represents a combination of the first scenario and the second scenario. The classifier entity 200 might therefore be configured to, when monitoring the subscriber update data request messages, start a timer when the one or more of the subscriber update data request messages pertains to a first move of the MSISDN of the first subscriber entity 130a to be associated with the IMSI of the second subscriber entity 130b, and stop the timer when the one or more of the subscriber update data request messages pertains to a second move of the MSISDN of the first subscriber entity 130a back to be associated with the IMSI of the first subscriber entity 130a. The classifier entity 200 might then compare the time duration between when the timer was started and when the timer was stopped to the first predefined timeframe. If the time duration is within the first predefined timeframe, this is an indication of the one or more of the subscriber update data request messages being associated with SIM swap fraud. In particular, according to some embodiments, the set of conditions further pertains to the second move occurring within a time threshold, corresponding to the first predefined timeframe, from the first move having occurred. If, within the first predefined timeframe, the MSISDN of the first subscriber entity 130a has its IMSI changed twice, with the IMSI of the second change being the IMSI of the first subscriber entity 130a and the IMSI of the first change being the IMSI of the second subscriber entity 130b, this increases the probability that the second subscriber entity 130b is performing SIM swap fraud.

An attacker might repeatedly swap the MSISDN of the victim across multiple IMSIs in sequence in an attempt to make it more difficult to identify the IMSI of the attacker. A third scenario where the one or more of the subscriber update data request messages that the classifier entity 200 monitors are indicative of SIM swap fraud is thus where it could be suspected that one or more of the subscriber update data request messages pertains to the MSISDN of the first subscriber entity 130a is swapped, in turn, to two or more respective IMSIs of one or more second subscriber entities. Particularly, according to an embodiment, the set of conditions further pertains to there, within a time threshold corresponding to a third predefined timeframe, being sent two or more of the subscriber update data request messages that pertain to moves of the MSISDN of the first subscriber entity 130a to be associated respective IMSIs of the second subscriber entity 130b. If, within the third predefined timeframe, the MSISDN of the first subscriber entity 130a has its IMSI changed more than twice, with the IMSI of the last change being the IMSI of the first subscriber entity 130a and the IMSI of any of the other changes being the IMSI of the second subscriber entity 130b, this increases the probability that the second subscriber entity 130b is performing SIM swap fraud.

Similar as disclosed in the first scenario above, if one and the same subscriber entity is, within the second predefined timeframe, associated with more than one MSISDN, this could indicate that this subscriber entity is performing SIM swap fraud. Particularly, in some embodiments, the one or more of the subscriber update data request messages pertains to a respective first move of MSISDNs of two or more first subscriber entities in the mobile network 100 to be associated with one and the same IMSI of the second subscriber entity 130b. This might indicate that the second subscriber entity 130b is performing SIM swap fraud.

Similar as disclosed in the second scenario above, if the one or more of the subscriber update data request messages pertains to the MSISDNs of two or more first subscriber entities being swapped back to the respective IMSIs of the two or more first subscriber entities, this could be an indication of that the two or more first subscriber entities are victims of SIM swap fraud. Particularly, in some embodiments, the one or more of the subscriber update data request messages pertains to a respective second move of the MSISDNs of the two or more first subscriber entities back to be associated with the respective IMSIs of the two or more first subscriber entities.

Similar as disclosed in the combination of the first scenario and the second scenario above, the classifier entity 200 might be configured to, when monitoring the subscriber update data request messages, measure the amount of time between when the respective MSISDNs of the two or more first subscriber entities being swapped to the IMSI of the second subscriber entity 130b and when the respective MSISDNs of the two or more first subscriber entities being swapped back to the respective IMSIs of the two or more first subscriber entities. As above, this might be implemented by starting and stopping timers. Particularly, in some embodiments, the set of conditions further pertains to all the respective second moves occurring within a time threshold, corresponding to the second predefined timeframe, from all respective first moves having occurred. If the same IMSI is identified across multiple SIM swap provisioning requests with the second predefined timeframe, this increases the probability that the second subscriber entity 130b is performing SIM swap fraud. Thus, if, within the second predefined timeframe, the IMSI of the second subscriber entity 130b is associated with MSISDNs of two or more first subscriber entities, this increases the probability that the second subscriber entity 130b is performing SIM swap fraud.

In some aspects the second subscriber entity 130b is identified as performing SIM swap fraud. In particular, according to some embodiments, the second subscriber entity 130b, as a result of the set of conditions being fulfilled, is by the classifier entity 200 identified as being responsible of the SIM swap fraud.

There might be different types of actions that the classifier entity 200 is configured to perform in S106. In some aspects operation of the IMSI of the second subscriber entity 130b is blocked. In particular, according to an embodiment, the classifier entity 200 is configured to perform S106*a* as part of the determination in S106:

S106*a*: The classifier entity 200 initiates Mocking operation of the IMSI of the second subscriber entity 130*b* served in the mobile network 100.

In some aspects operation of the IMSI of the second subscriber entity 130*b* is reported. In particular, according to an embodiment, the classifier entity 200 is configured to perform S106*b* as part of the determination in S106:

S106*b*: The classifier entity 200 reports the IMSI of the second subscriber entity 130*b* to a network management system.

In some non-limiting examples, S106*a* is performed in combination with that the classifier entity 200 is configured to in S102 intercept the subscriber update data request messages online. In some non-limiting examples, S106*b* is performed in combination with that the classifier entity 200 is configured to in S102 retrieve the subscriber update data request messages offline. The IMSIs used for the SIM swap fraud might thus be identified and either blocked during real-time analysis or reported during offline analysis.

Figure 3:
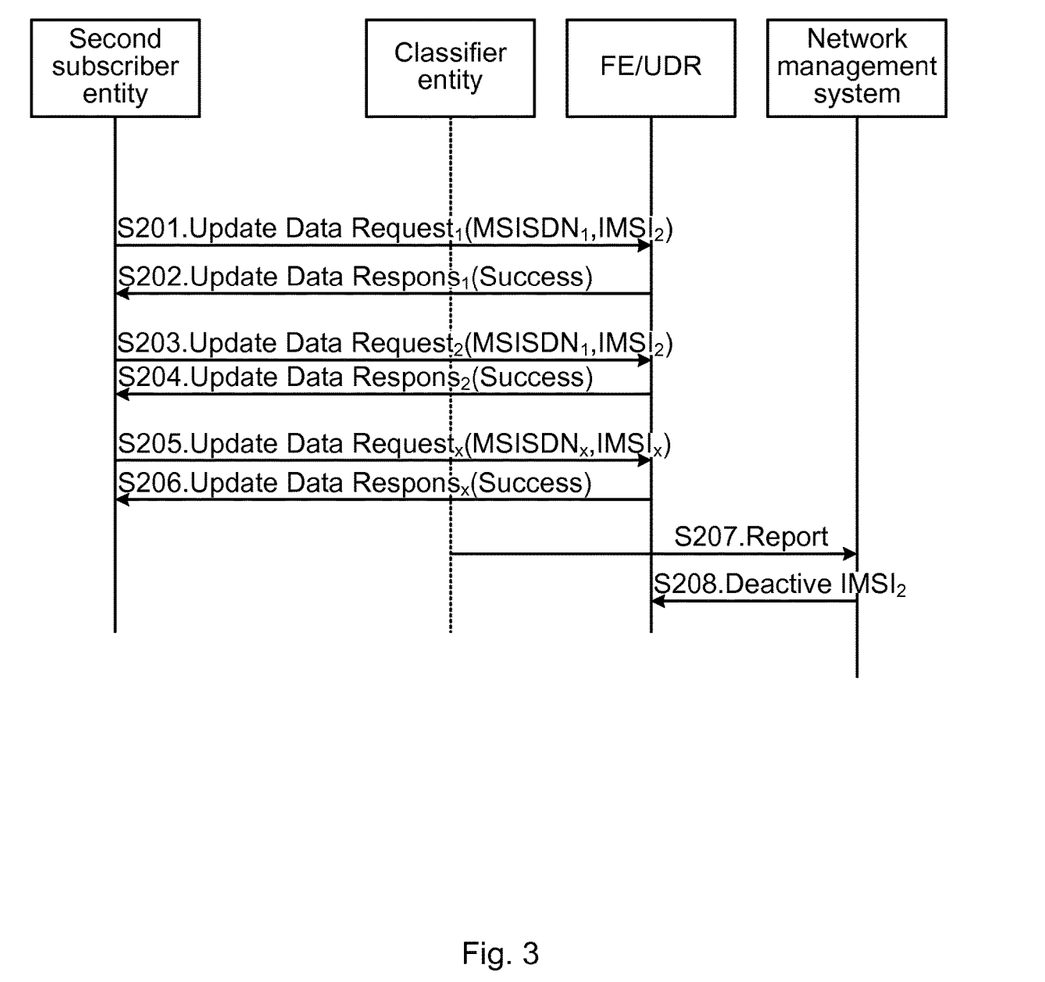
FIG. 3 is a signalling diagram according to an embodiment.

One particular embodiment for detecting SIM swap fraud based on at least some of the above embodiment will now be disclosed with reference to the signalling diagram of FIG. 3. Here it is for illustrative purposes assumed that the first subscriber entity 130*a* represents the victim of the SIM swap fraud and is associated with a first MSISDN, denoted MSISDN1, and a first IMSI, denoted IMSI1, and that the second subscriber entity 130*b* represents the attacker and is associated with a second MSISDN, denoted MSISDN2, and a second IMSI, denoted IMSI2.

S201: The second subscriber entity 130*b* requests, by causing the second network entity to send a subscriber update data request message to the FE/UDR, MSISDN1 to be associated with IMSI2.

S202: The FE/UDR, upon having been updated accordingly, responds with a subscriber update data response message indicating success of the request.

S203: The second subscriber entity 130*b* requests, by causing the second network entity to send a subscriber update data request message to the FE/UDR, MSISDN1 to again be associated with IMSI1.

S204: The FE/UDR, upon having been updated accordingly, responds with a subscriber update data response message indicating success of the request.

Between S202 and S204 MSISDN1 thus has its IMSI changed twice, with the IMSI changed to in the first request is the IMSI of the attacker and the IMSI changed to in the second request is the IMSI of the victim.

S205: The second subscriber entity 130*b* requests, by causing the second network entity to send a subscriber update data request message to the FE/UDR, the MSISDN (denoted MSISDNx) of another first subscriber entity representing another victim of the SIM swap fraud to be associated with IMSI2.

S206: The FE/UDR, upon having been updated accordingly, responds with a subscriber update data response message indicating success of the request.

The second subscriber entity 130*b* might then, similar as in S203 and S204, request MSISDNx to again be associated with said another first subscriber entity representing said another victim.

Between S201 and S206 IMSI2 is associated with three different MSISDNs; first its own MSISDN, i.e., MSISDN2, then MSISDN1 belonging to the first victim, and then MSISDNx belonging to the second victim.

By monitoring the subscriber update data request messages between the second network entity and the FE/UDR and performing the analysis as disclosed above, the classifier entity 200 is thus enabled to, depending on its configuration, detect the SIM swap fraud and identify the second subscriber entity 130*b* as responsible for the SIM swap fraud and report this as in S207:

S207: The classifier entity 200 reports, to the network management system, the second subscriber entity 130*b*, as associated with IMSI2, as a potential attacker responsible for SIM swap fraud.

S208: The network management system, upon having received the report, instructs the FE/UDR to deactivate IMSI2.

Figure 4:
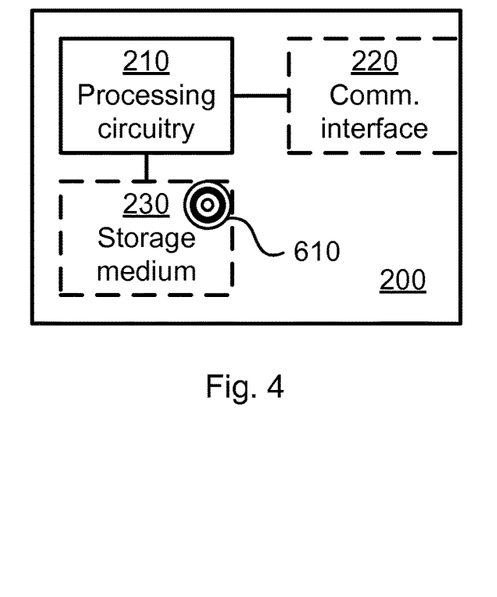
FIG. 4 is a schematic diagram showing functional units of a classifier entity according to an embodiment.

FIG. 4 schematically illustrates, in terms of a number of functional units, the components of a classifier entity 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 610 (as in FIG. 6), e.g. in the form of a storage medium 230. The processing circuitry 210 may further be provided as at least one application specific integrated circuit (ASIC), or field programmable gate array (FPGA).

Particularly, the processing circuitry 210 is configured to cause the classifier entity 200 to perform a set of operations, or steps, as disclosed above. For example, the storage medium 230 may store the set of operations, and the processing circuitry 210 may be configured to retrieve the set of operations from the storage medium 230 to cause the classifier entity 200 to perform the set of operations. The set of operations may be provided as a set of executable instructions.

Thus, the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The classifier entity 200 may further comprise a communications interface 220 at least configured for communications with other entities, node, functions, and devices of the mobile network 100. As such the communications interface 220 may comprise one or more transmitters and receivers, comprising analogue and digital components. The processing circuitry 210 controls the general operation of the classifier entity 200 e.g. by sending data and control signals to the communications interface 220 and the storage medium 230, by receiving data and reports from the communications interface 220, and by retrieving data and instructions from the storage medium 230. Other components, as well as the related functionality, of the classifier entity 200 are omitted in order not to obscure the concepts presented herein.

Figure 5:
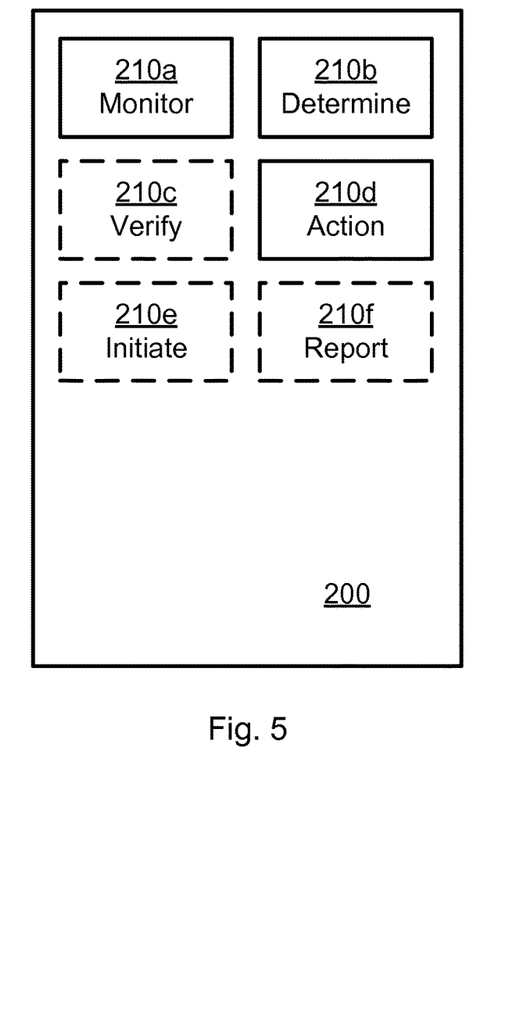
FIG. 5 is a schematic diagram showing functional modules of a classifier entity according to an embodiment.

FIG. 5 schematically illustrates, in terms of a number of functional modules, the components of a classifier entity 200 according to an embodiment. The classifier entity 200 of FIG. 5 comprises a number of functional modules; a monitor module 210 configured to perform step S102, a determine module 210*b* configured to perform step S104, and an action module 210*d* configured to perform step S106. The classifier entity 200 of FIG. 5 may further comprise a number of optional functional modules, such as any of a verify module 210*c* configured to perform step S104*a*, an initiate module 210*e* configured to perform step S106*a*, and a report module 210*f* configured to perform step S106*b*. In general terms, each functional module 210*a*-210*f* may in one embodiment be implemented only in hardware and in another embodiment with the help of software, i.e., the latter embodiment having computer program instructions stored on the storage medium 230 which when run on the processing circuitry makes the classifier entity 200 perform the corresponding steps mentioned above in conjunction with FIG. 5. It should also be mentioned that even though the modules correspond to parts of a computer program, they do not need to be separate modules therein, but the way in which they are implemented in software is dependent on the programming language used. Preferably, one or more or all functional modules 210a-210f may be implemented by the processing circuitry 210, possibly in cooperation with the communications interface 220 and/or the storage medium 230. The processing circuitry 210 may thus be configured to from the storage medium 230 fetch instructions as provided by a functional module 210a-210f and to execute these instructions, thereby performing any steps as disclosed herein.

The classifier entity 200 may be provided as a standalone device or as a part of at least one further device. As disclosed above, the classifier entity 200 might be part of a Security Monitoring Agent. The classifier entity 200 may be provided in a node of the radio access network or in a node of the core network. Alternatively, functionality of the classifier entity 200 may be distributed between at least two devices, or nodes. These at least two nodes, or devices, may either be part of the same network part (such as the radio access network or the core network) or may be spread between at least two such network parts.

A first portion of the instructions performed by the classifier entity 200 may be executed in a first device, and a second portion of the of the instructions performed by the classifier entity 200 may be executed in a second device; the herein disclosed embodiments are not limited to any particular number of devices on which the instructions performed by the classifier entity 200 may be executed. Hence, the methods according to the herein disclosed embodiments are suitable to be performed by a classifier entity 200 residing in a cloud computational environment. Therefore, although a single processing circuitry 210 is illustrated in FIG. 4 the processing circuitry 210 may be distributed among a plurality of devices, or nodes. The same applies to the functional modules 210a-210f of FIG. 5 and the computer program 620 of FIG. 6.

Figure 6:
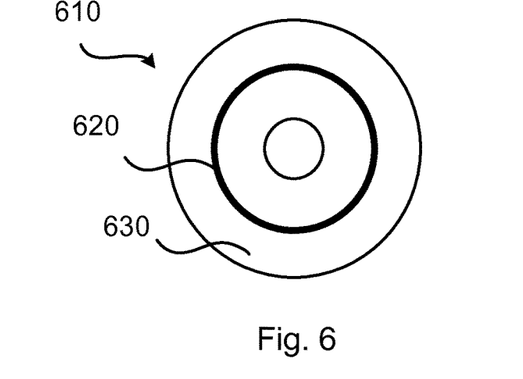
FIG. 6 shows one example of a computer program product comprising computer readable storage medium according to an embodiment.

FIG. 6 shows one example of a computer program product 610 comprising computer readable storage medium 630. On this computer readable storage medium 630, a computer program 620 can be stored, which computer program 620 can cause the processing circuitry 210 and thereto operatively coupled entities and devices, such as the communications interface 220 and the storage medium 230, to execute methods according to embodiments described herein. The computer program 620 and/or computer program product 610 may thus provide means for performing any steps as herein disclosed.

In the example of FIG. 6, the computer program product 610 is illustrated as an optical disc, such as a CD (compact disc) or a DVD (digital versatile disc) or a Blu-Ray disc. The computer program product 610 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 620 is here schematically shown as a track on the depicted optical disk, the computer program 620 can be stored in any way which is suitable for the computer program product 610.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for detecting Subscriber Identity Module, SIM, swap fraud, the method being performed by a classifier entity, the method comprising:
monitoring subscriber update data request messages sent as part of an update data procedure between a first network entity and a second network entity in a mobile network;
determining that one or more of the subscriber update data request messages is associated with SIM swap fraud by verifying that the subscriber update data request messages fulfil a set of conditions pertaining at least to: an Mobile Station Integrated Services Digital Network, MSISDN, of a first subscriber entity in the mobile network within a first predefined timeframe being associated with more than one International Mobile Subscriber Identity, IMSI, and/or an IMSI of a second subscriber entity in the mobile network within a second predefined timeframe being associated with more than one MSISDN, wherein the one or more of the subscriber update data request messages pertains to a respective first move of MSISDNs of two or more first subscriber entities in the mobile network to be associated with one and the same IMSI of the second subscriber entity; and
performing, upon the set of conditions being fulfilled for the one or more of the subscriber update data request messages, an action according to which the IMSI of the second subscriber entity is associated with SIM swap fraud.

2. The method according to claim 1, wherein the determining comprises:
verifying that the one or more of the subscriber update data request messages cannot be matched to any initial event invoking the update data procedure with a customer care system in the mobile network.

3. The method according to claim 1, wherein the set of conditions further pertains to, within a time threshold corresponding to a third predefined timeframe, being sent two or more of the subscriber update data request messages that pertain to moves of the MSISDN of the first subscriber entity to be associated with respective IMSIs of the second subscriber entity.

4. The method according to claim 1, wherein the one or more of the subscriber update data request messages pertains to a respective second move of the MSISDNs of the two or more first subscriber entities back to be associated with the respective IMSIs of the two or more first subscriber entities.

5. The method according to claim 4, wherein the set of conditions further pertains to all the respective second moves occurring within a time threshold, corresponding to the second predefined timeframe, from all respective first moves having occurred.

6. The method according to claim 1, wherein the second subscriber entity, as a result of the set of conditions being fulfilled, is by the classifier entity identified as being responsible of the SIM swap fraud.

7. The method according to claim 1, wherein the subscriber update data request messages are monitored either by being intercepted online between the first network entity and the second network entity or by being retrieved offline from a database.

8. The method according to claim 7, wherein the subscriber update data request messages are intercepted over the Ud interface, a provisioning interface, a customer adaptation interface or a network interface.

9. The method according to claim 1, wherein the subscriber update data request messages are sent from the second network entity, being any of a customer care/provisioning Front-End, a customer care system, a mediation/provisioning gateway, towards the first network entity, being any of a Home Locations Register Front-End, an Authentication Centre, a Home Subscriber Server Front-End and a Centralized User Database in a Unified Data Repository.

10. The method according to claim 1, wherein the subscriber update data request messages pertain to modifying user data in a Unified Data Repository.

11. The method according to claim 1, wherein performing the action comprises at least one of:
initiating blocking operation of the IMSI of the second subscriber entity in the mobile network; and
reporting the IMSI of the second subscriber entity to a network management system.

12. The method according to claim 1, wherein the classifier entity is part of a Security Monitoring Agent.

13. A classifier entity for detecting SIM swap fraud, the classifier entity comprising processing circuitry, the processing circuitry being configured to cause the classifier entity to:
monitor subscriber update data request messages sent as part of an update data procedure between a first network entity and a second network entity in a mobile network;
determine that one or more of the subscriber update data request messages is associated with SIM swap fraud by verifying that the subscriber update data request messages fulfil a set of conditions pertaining at least to: an MSISDN of a first subscriber entity in the mobile network within a first predefined timeframe being associated with more than one IMSI, and/or an IMSI of a second subscriber entity in the mobile network within a second predefined timeframe being associated with more than one MSISDN, wherein the one or more of the subscriber update data request messages pertains to a respective first move of MSISDNs of two or more first subscriber entities in the mobile network to be associated with one and the same IMSI of the second subscriber entity; and
perform, upon the set of conditions being fulfilled for the one or more of the subscriber update data request messages, an action according to which the IMSI of the second subscriber entity is associated with SIM swap fraud.

14. The classifier entity according to claim 13, further being configured to verify that the one or more of the subscriber update data request messages cannot be matched to any initial event invoking the update data procedure with a customer care system in the mobile network.

15. A classifier entity for detecting SIM swap fraud, the classifier entity comprising:
a monitor module configured to monitor subscriber update data request messages sent as part of an update data procedure between a first network entity and a second network entity in a mobile network;
a determine module configured to determine that one or more of the subscriber update data request messages is associated with SIM swap fraud by verifying that the subscriber update data request messages fulfil a set of conditions pertaining at least to: an MSISDN of a first subscriber entity in the mobile network within a first predefined timeframe being associated with more than one IMSI, and/or an IMSI of a second subscriber entity in the mobile network within a second predefined timeframe being associated with more than one MSISDN, wherein the one or more of the subscriber update data request messages pertains to a respective first move of MSISDNs of two or more first subscriber entities in the mobile network to be associated with one and the same IMSI of the second subscriber entity; and
an action module configured to perform, upon the set of conditions being fulfilled for the one or more of the subscriber update data request messages, an action according to which the IMSI of the second subscriber entity is associated with SIM swap fraud.

16. A computer program product for detecting SIM swap fraud comprising a non-transitory computer readable medium storing a computer program comprising computer code which, when run on processing circuitry of a classifier entity, causes the classifier entity to:
monitor subscriber update data request messages sent as part of an update data procedure between a first network entity and a second network entity in a mobile network;
determine that one or more of the subscriber update data request messages is associated with SIM swap fraud by verifying that the subscriber update data request messages fulfil a set of conditions pertaining at least to: an MSISDN of a first subscriber entity in the mobile network within a first predefined timeframe being associated with more than one IMSI, and/or an IMSI of a second subscriber entity in the mobile network within a second predefined timeframe being associated with more than one MSISDN, wherein the one or more of the subscriber update data request messages pertains to a respective first move of MSISDNs of two or more first subscriber entities in the mobile network to be associated with one and the same IMSI of the second subscriber entity; and
perform, upon the set of conditions being fulfilled for the one or more of the subscriber update data request messages, an action according to which the IMSI of the second subscriber entity is associated with SIM swap fraud.

* * * * *